US012572164B2

(12) United States Patent
Zhenduo et al.

(10) Patent No.: US 12,572,164 B2
(45) Date of Patent: Mar. 10, 2026

(54) DUAL MODEL-BASED TEMPERATURE CONTROLLER

(71) Applicant: ASM IP Holding, B.V., Almere (NL)

(72) Inventors: Liu Zhenduo, Amersfoort (NL);
Theodorus G.M. Oosterlaken,
Oudewater (NL)

(73) Assignee: ASM IP Holding B.V., Almere (NL)

( * ) Notice: Subject to any disclaimer, the term of this patent is extended or adjusted under 35 U.S.C. 154(b) by 308 days.

(21) Appl. No.: 18/344,543

(22) Filed: Jun. 29, 2023

(65) Prior Publication Data

US 2024/0004409 A1 Jan. 4, 2024

Related U.S. Application Data

(60) Provisional application No. 63/367,384, filed on Jun. 30, 2022.

(51) Int. Cl.
*G05D 23/19* (2006.01)
*H05B 1/02* (2006.01)

(52) U.S. Cl.
CPC ....... *G05D 23/1931* (2013.01); *H05B 1/0247* (2013.01)

(58) Field of Classification Search
CPC .. G05B 13/048; G05B 23/0254; G05B 11/32; G05B 11/42; H01L 21/67248
See application file for complete search history.

(56) References Cited

U.S. PATENT DOCUMENTS

| | | | |
|---|---|---|---|
| 5,895,596 A | 4/1999 | Stoddard | |
| 6,373,033 B1 | 4/2002 | de Waard | |
| 7,006,900 B2 | 2/2006 | Zhenduo | |
| 2004/0098145 A1* | 5/2004 | Zhenduo | G05B 13/0275 700/20 |
| 2018/0341252 A1* | 11/2018 | Lu | G05B 13/048 |

* cited by examiner

*Primary Examiner* — Darrin D Dunn
(74) *Attorney, Agent, or Firm* — Banner & Witcoff, Ltd.

(57) ABSTRACT

Temperature control systems and methods for a thermal reactor having a process chamber, the control system comprising a first control loop comprising a first Model-Based Predictive Controller (MBPC) and a second control loop comprising a second MBPC, wherein the first and second MBPC are provided with predictive models representing the behavior of the thermal reactor.

15 Claims, 5 Drawing Sheets

DUAL MODEL-BASED TEMPERATURE CONTROLLER

CROSS-REFERENCE TO RELATED APPLICATIONS

This application claims the benefit of U.S. Provisional Application 63/367,384 filed on Jun. 30, 2022, the entire contents of which are incorporated herein by reference.

FIELD

In general, the invention disclosed herein relates to cascade model-based control systems having nested control loops for controlling a plant, such as, for example, a thermal reactor for the processing of semiconductor substrates.

BACKGROUND

In semiconductor processing, the wafer size continues to increase and the integrated circuit feature size continues to decrease. Further increases in wafer size and further decreases in feature size require improvements in thermal process control. The temperature at which wafers are processed has a first-order influence on the diffusion, deposition, and other thermal processes. Batch furnaces continue to play a significant role for thermal processing because of their large batch size and correspondingly low cost per processed wafer. A target in batch thermal processing is to achieve improved temperature control while maintaining high equipment utilization and large wafer batch sizes. The requirements of high-quality temperature control include a high ramp rate with good temperature uniformity during the ramp, fast temperature stabilization with little or no temperature overshoot, smaller steady-state temperature error band, shorter downtime for controller parameter tuning, etc.

Traditional single-loop Proportional-Integral-Derivative (PID) controllers cannot achieve the required temperature control performance. Also PID controllers with cascade or nested control loops have been used in attempts to provide improved temperature control. However, these and other approaches have practical drawbacks related to complexity and computational requirements leading to sub-optimal temperature control of the semiconductor manufacturing processes.

Therefore, a need exists for systems and method which provide improved temperature control, resulting in the overall improvement of semiconductor manufacturing processes.

SUMMARY

The methods and systems described herein solve these and other problems by providing computationally-efficient dual cascade MBPC control systems that can be implemented on a typical control microprocessor.

An aspect of the present disclosure relates to a temperature control system for a thermal reactor having a process chamber, the control system comprising:

a first control loop comprising a first Model-Based Predictive Controller (MBPC), using a spike temperature sensor signal as input for the first MBPC, which provides an output signal that controls power to a heating element of a thermal reactor, the spike temperature sensor being located in proximity to the heating element and spaced from the process chamber, wherein the first MBPC is provided with a first predictive model representing the behavior of the thermal reactor, the first MBPC being configured to calculate an output value based on calculations over a predictive time horizon, using the first predictive model, said output value controlling the power output signal; and a second control loop comprising a second MBPC, using a paddle temperature sensor signal and a spike temperature sensor signal as inputs for the second MBPC, which provides as an output a spike temperature control setpoint that is used as input for the first MBPC in the first control loop, the paddle temperature sensor being spaced from the heating element and located inside or in proximity to the process chamber and the spike temperature sensor being located in proximity to the heating element and spaced from the process chamber, wherein the second MBPC is provided with a second predictive model representing the behavior of the thermal reactor, the second MBPC being configured to calculate an output value based on calculations over a predictive time horizon, using the second predictive model.

In one embodiment, the temperature control system as disclosed herein provides that the first and/or second MBPC is provided with one or more generic linear dynamic models that characterize thermal response of the thermal reactor. In particular, the same generic linear dynamic model is provided for the first and the second MBPC. More in particular, the same generic linear dynamic model is provided for the first and the second MBPC but the steady state gain factor for the first and the second MBPC model is different.

In one embodiment, disclosed herein is a temperature control system wherein model mismatch correction factors are added to the model predictive calculation and output optimization calculations.

In one embodiment, the temperature control system as disclosed herein provides that the first and/or second MBPC comprises a trajectory planner which automatically reduces a specified ramp rate when approaching a constant temperature control setpoint.

Another aspect of the present disclosure relates to a control system comprising:

a first control loop comprising a first Model-Based Predictive Controller (M BPC) for controlling a plant with an output signal that controls power to a heating element in a process chamber of said plant, said first MBPC being configured to receive sensor data from at least one spike temperature sensor located in proximity to the heating element and spaced from the process chamber, and said output signal is based at least in part on calculations in said first MBPC over a predictive time horizon; and a second control loop comprising a second MBPC, said second MBPC being configured to provide a control setpoint to said first MBPC, said control setpoint based at least in part on calculations in said second MBPC over a predictive time horizon, said second MBPC further configured to receive sensor data from:

(1) at least one paddle temperature sensor located inside or in proximity to the process chamber and spaced from the heating element; and (2) at least one spike temperature sensor located in proximity to the heating element and spaced from the process chamber.

In one embodiment, the control system as disclosed herein provides that the first and/or second MBPC is provided with one or more generic linear dynamic models that characterize thermal response of the thermal reactor. In particular, the same generic linear dynamic model is provided for the first and the second MBPC. More in particular, the same generic linear dynamic model is provided for the first and the second MBPC but the steady state gain factor for the first and the second MBPC model is different.

In one embodiment, disclosed herein is a control system wherein model mismatch correction factors are added to the model predictive calculation and output optimization calculations.

Another aspect of the present disclosure relates to a method for controlling a plant having a process chamber, comprising:

providing control inputs to said plant from a first control loop, said first control loop comprising a first MBPC configured to receive sensor data from a least one spike temperature sensor located in proximity to a heating element and spaced from the process chamber, and said control inputs being based at least in part on calculations in said first MBPC over a predictive time horizon; and providing a control setpoint to said first control loop, said control setpoint being computed by a second control loop comprising a second MBPC configured to receive sensor data from:

(1) at least one paddle temperature sensor located inside or in proximity to the process chamber and spaced from the heating element; and (2) at least one spike temperature sensor located in proximity to the heating element and spaced from the process chamber;

said second MBPC further being configured to receive a control process sequence for said plant, and said second MBPC being configured to calculate said control setpoint based at least in part on calculations in said second MBPC over a predictive time horizon.

In one embodiment, the method as disclosed herein provides that the first and/or second MBPC is provided with one or more generic linear dynamic models that characterize thermal response of the thermal reactor. In particular, the same generic linear dynamic model is employed in the first and the second MBPC. More in particular, the same generic linear dynamic model is employed in the first and the second MBPC but the steady state gain factor used for the first and the second MBPC model is different.

In one embodiment, disclosed herein is a method wherein model mismatch correction factors are added to the model predictive calculation and output optimization calculations.

BRIEF DESCRIPTION OF THE DRAWINGS

The following description of the figures relate to specific embodiments of the disclosure which are merely exemplary in nature and not intended to limit the present teachings, their application or uses.

Throughout the drawings, the corresponding reference numerals indicate the following parts and features.

DETAILED DESCRIPTION

Figure 1A:
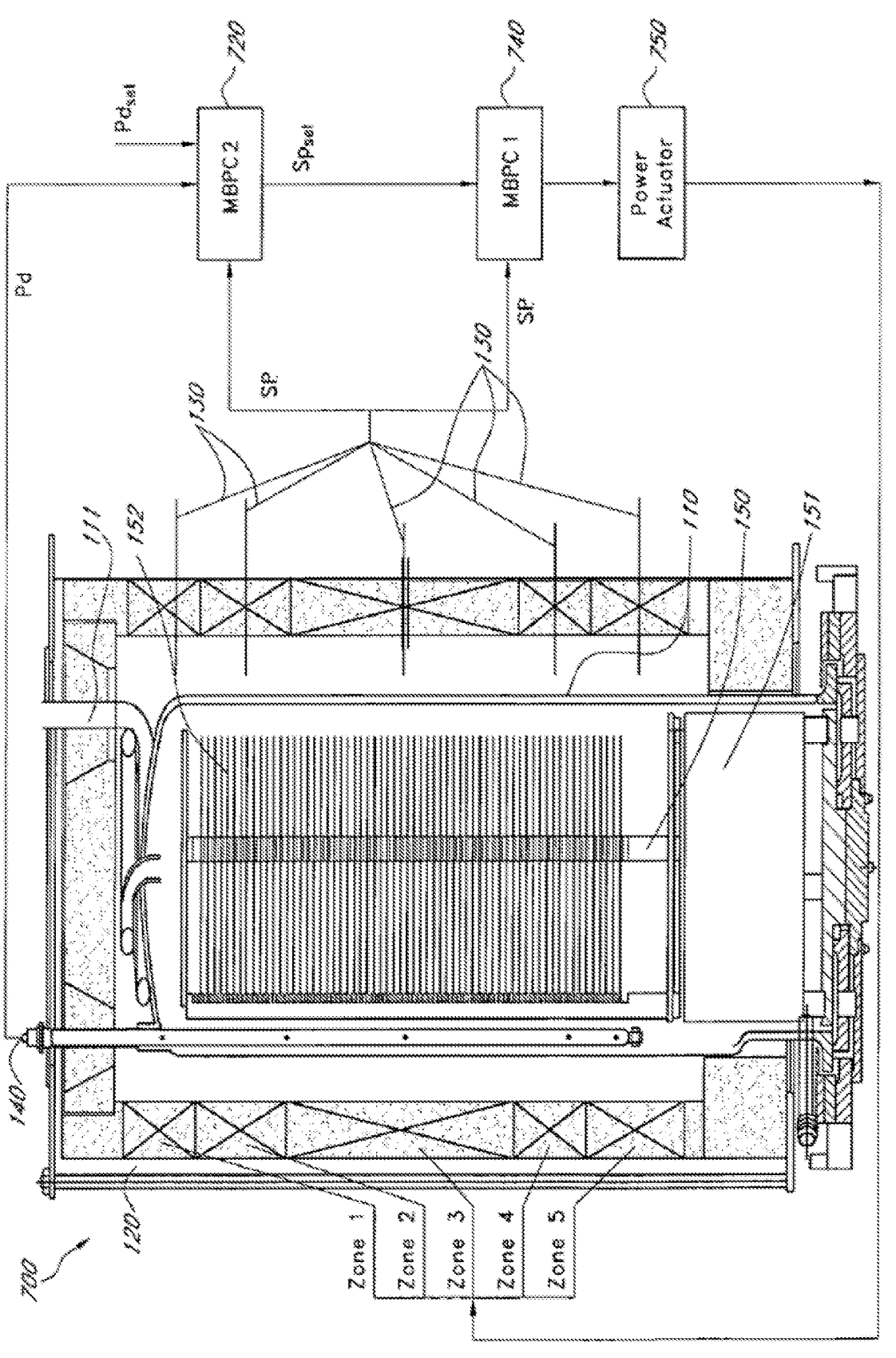
FIGS. 1a and 1b show a vertical thermal reactor with the dual cascade MBPC control configuration.

In the following detailed description, the technology underlying the present disclosure will be described by means of different aspects thereof. It will be readily understood that the aspects of the present disclosure, as generally described herein, and illustrated in the figures, can be arranged, substituted, combined, and designed in a wide variety of different configurations, all of which are explicitly contemplated and make part of this disclosure. This description is meant to aid the reader in understanding the technological concepts more easily, but it is not meant to limit the scope of the present disclosure, which is limited only by the claims.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment.

As used herein, the terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" when referring to recited members, elements or method steps also include embodiments which "consist of" said recited members, elements or method steps. The singular forms "a", "an", and "the" include both singular and plural referents unless the context clearly dictates otherwise.

As used herein, relative terms, such as "left," "right," "front," "back," "top," "bottom," "over," "under," etc., are used for descriptive purposes and not necessarily for describing permanent relative positions. It is to be understood that such terms are interchangeable under appropriate circumstances and that the embodiment as described herein are capable of operation in other orientations than those illustrated or described herein unless the context clearly dictates otherwise.

Objects described herein as being "adjacent" to each other reflect a functional relationship between the described objects, that is, the term indicates the described objects must be adjacent in a way to perform a designated function which may be a direct (i.e. physical) or indirect (i.e. close to or near) contact, as appropriate for the context in which the phrase is used.

Objects described herein as being "connected" or "coupled" reflect a functional relationship between the described objects, that is, the terms indicate the described objects must be connected in a way to perform a designated function which may be a direct or indirect connection in an electrical or nonelectrical (i.e. physical) manner, as appropriate for the context in which the term is used.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "about" is used to provide flexibility to a numerical value or range endpoint by providing that a given value may be "a little above" or "a little below" said value or endpoint, depending on the specific context. Unless otherwise stated, use of the term "about" in accordance with a specific number or numerical range should also be understood to provide support for such numerical terms or range without the term "about". For example, the recitation of "about 30" should be construed as not only providing support for values a little above and a little below 30, but also for the actual numerical value of 30 as well.

The recitation of numerical ranges by endpoints includes all numbers and fractions subsumed within the respective ranges, as well as the recited endpoints. Furthermore, the terms first, second, third and the like in the description and in the claims, are used for distinguishing between similar elements and not necessarily for describing a sequential or chronological order, unless specified. It is to be understood that the terms so used are interchangeable under appropriate circumstances and that the embodiments of the disclosure described herein are capable of operation in other sequences than described or illustrated herein.

Reference in this specification may be made to devices, structures, systems, or methods that provide "improved" performance (e.g. increased or decreased results, depending on the context). It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

In addition, embodiments of the present disclosure may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software (e.g., instructions stored on non-transitory computer-readable medium) executable by one or more processing units, such as a microprocessor and/or application specific integrated circuits. As such, it should be noted that a plurality of hardware and software-based devices, as well as a plurality of different structural components may be utilized to implement the technology of the present disclosure. For example, "servers" and "computing devices" described in the specification can include one or more processing units, one or more computer-readable medium modules, one or more input/output interfaces, and various connections connecting the components.

An overview of various aspects of the technology of the present disclosure is given hereinbelow, after which specific embodiments will be described in more detail. This overview is meant to aid the reader in understanding the technological concepts more quickly, but it is not meant to identify the most important or essential features thereof, nor is it meant to limit the scope of the present disclosure, which is limited only by the claims. When describing specific embodiments, reference is made to the accompanying drawings, which are provided solely to aid in the understanding of the described embodiment.

The methods and systems described herein provide computationally-efficient dual cascade MBPC (Model-Based Predictive Controller) control systems that can be implemented on a typical control microprocessor.

In one embodiment, the dual cascade MBPC control system as disclosed herein is a cascade-type system with nested control loops having a first MBPC controller in an inner control loop and second MBPC controller in an outer control loop. In a particular embodiment the second MBPC controller acts as a main or outer control loop, and first MBPC controller is used as a slave or inner control loop.

In one embodiment, the dual cascade MBPC can be used to control a thermal process reactor where the second MBPC controller generates the desired spike control setpoint according to both planned paddle control setpoint trajectory and the predictive model related to paddle and spike TC. In the thermal process reactor, the first MBPC controller is used to control the power actuator of the heater to reach the required spike control setpoint by acting as a local system to quickly follow changes in the spike control setpoints.

The tuning parameters for the first MBPC control loop are relatively weakly coupled with the second MBPC control loop. The sampling time ts1 in the first MBPC control loop is preferably shorter as compared to the sampling time ts2 in the second MBPC control loop. In one embodiment, ts1 is on the order of approximately 1 second and ts2 is on the order of approximately 4 seconds.

Compared to other existing temperature control systems, the model order and the predictive time horizon in the control scheme as disclosed herein can dramatically be reduced while the model still adequately describes and predicts the behavior of the actual system.

Accordingly, an aspect of the present disclosure relates to a temperature control system for a thermal reactor having a process chamber, the control system comprising:

a first control loop comprising a first MBPC, using a spike temperature sensor signal as input for the first MBPC, which provides an output signal that controls power to a heating element of a thermal reactor, the spike temperature sensor being located in proximity to the heating element and spaced from the process chamber, wherein the first MBPC is provided with a first predictive model representing the behavior of the thermal reactor, the first MBPC being configured to calculate an output value based on calculations over a predictive time horizon, using the first predictive model, said output value controlling the power output signal; and a second control loop comprising a second MBPC, using a paddle temperature sensor signal and optionally a spike temperature sensor signal as inputs for the second MBPC, which provides as an output a spike temperature control setpoint that is used as input for the first MBPC in the first control loop, the paddle temperature sensor being spaced from the heating element and located inside or in proximity to the process chamber and the optional spike temperature sensor being located in proximity to the heating element and spaced from the process chamber, wherein the second MBPC is provided with a second predictive model representing the behavior of the thermal reactor, the second MBPC being configured to calculate an output value based on calculations over a predictive time horizon, using the second predictive model.

With the advances in modern control technology and system identification, more advanced control systems, such as, for example Model-Based Predictive Controllers (MBPC), have been developed, but these more advanced control methods are often computationally complex, typically requiring matrix inversion during online processing. However, the dual cascade MBPC control system as disclosed herein allows for am efficient and fast processing.

The second MBPC receives as input a paddle control setpoint $Pd_{set}$, the actual paddle temperatures Pd and optionally the actual spike temperatures Sp and calculates as output a spike control setpoint $Sp_{set}$. The second MBPC uses a predictive model representing the behavior of the thermal reactor to compute the predictive control signals by minimizing an objective function to provide on-line optimization control. The first MBPC receives as input the spike control setpoint $Sp_{set}$ from the second MBPC and the actual spike temperatures Sp and calculates as output power output signal Pw that is provided to a power actuator which provides power to control the heating elements of the thermal reactor. The first MBPC uses a predictive model representing the behavior of the thermal reactor to compute the predictive control signals by minimizing an objective function to provide on-line optimization control. Since the models are simplified, the first and the second MBPC will require a relatively less amount of computational resources, even when constraints are considered.

A "controller" may be coupled to various components of the processing system for controlling the operation thereof. The controller generally comprises a central processing unit (CPU), a memory, and support circuits for the CPU. The controller may control the processing system directly, or via computers (or controllers) associated with particular process chamber and/or the support system components. The controller may be one of any form of general-purpose computer processor that can be used in an industrial setting for controlling various chambers and sub-processors. The memory, or computer-readable medium of the CPU may be one or more of readily available memory such as random access memory (RAM), read only memory (ROM), floppy disk, hard disk, flash, or any other form of digital storage, local or remote. The support circuits are coupled to the CPU for supporting the processor in a conventional manner. These circuits include cache, power supplies, clock circuits, input/output circuitry and subsystems, and the like. Inventive methods as described herein may be stored in the memory as software routine that may be executed or invoked to control the operation of the processing system in the manner described herein. The software routine may also be stored and/or executed by a second CPU (not shown) that is remotely located from the hardware being controlled by the CPU.

A vertical thermal reactor system with the dual cascade MBPC control configuration 700 as disclosed herein is shown in FIG. 1a. The vertical thermal reactor includes a process chamber 110 delimiting a process region. The process chamber may be configured for ALD, CVD, or the like and is preferably a long quartz or silicon carbide process chamber. A batch of wafers 152, accommodated in a wafer boat 150, placed on a pedestal 151 for support and thermal isolation, are inserted into the process chamber 110. The process chamber 110 includes an inlet 111 and an outlet for process gas. The process chamber is surrounded by a heating element 120 having multiple zone heating coils (zone 1, zone 2, zone 3, zone 4 and zone 5), preferably electric heating coils. Each zone has one or more temperature sensors. In FIG. 1a, each zone has a spike ThermoCouple (TC) 130 and a "profile" or paddle ThermoCouple (TC) 140. The spike TC produces a spike TC signal corresponding to a spike temperature. The paddle TC produces a paddle TC signal corresponding to a paddle temperature. The spike TCs 130 are located outside the process chamber 110 relatively near the heating element and the paddle TCs are located inside the chamber 110 relatively near the wafers. The vertical reactor system, using the resistive heating element 120 to control temperature, is an inherently non-linear system because a heating element can only generate, not absorb, heat. Further, due to the large physical mass of the heating element 120, process chamber 110, and wafer batch 152, and a correspondingly high thermal mass or heat capacity, the vertical thermal reactor exhibits long time constants or delay times. This means that after increasing the power input of one or more of the heating coils in zones 1 to 5, it takes a relatively long time before a new steady-state at a higher temperature is achieved. When the reactor temperature is higher than the control setpoint, cooling occurs at a rate that depends on the reactor design and its temperature, not on the controller. In the case of overshoot, it takes a relatively long time before the system is cooled down to the control setpoint again, especially at lower temperatures where the natural cooling rate is lower. Due to the lagging response time of the reactor, the improved dual cascade MBPC control system as disclosed herein allows for a more efficient and secure control of the reactor temperature.

The vertical thermal reactor as shown in FIG. 1a is controlled by the dual cascade control system. A paddle control setpoint $Pd_{set}$, the actual paddle temperatures Pd and the actual spike temperatures Sp are provided to the second MBPC controller 720, which generates a spike control setpoint $Sp_{set}$. A first MBPC controller 740 uses the spike error signal and the actual spike temperatures Sp to generate a power output signal that is provided to a power actuator 750 to provide power to control the heating element 120.

Figure 1B:
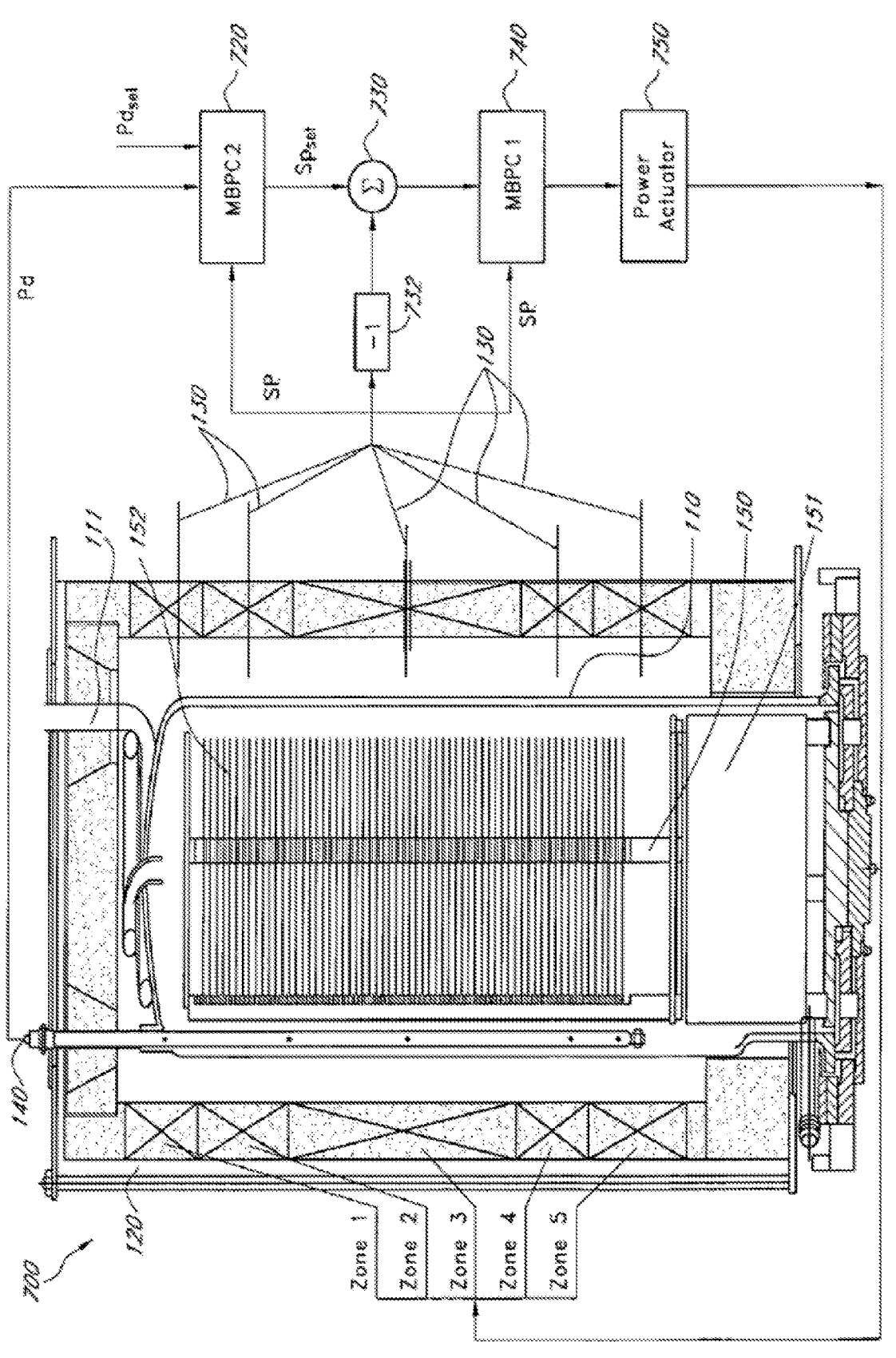

The configuration of the vertical thermal reactor system shown in FIG. 1b is identical to the configuration in FIG. 1a with the exception that between the first and second MBPC an adder 730 is present which computes a spike TC error signal using the spike control setpoint $Sp_{set}$ and the actual spike temperatures Sp, provided to the adder 730 via an inverter 732. The adder 730 calculates a spike error signal Es by subtracting the actual spike temperature Sp from the spike control setpoint $Sp_{set}$. The spike error signal Es is than provided as input for the first MBPC instead of the spike control setpoint $Sp_{set}$. The adder 730 is added to the configuration in FIG. 1b as a failsafe to detect measurement hardware failures in the thermocouples.

A typical thermal process starts at a standby temperature at which the wafers are loaded into the thermal reactor. After loading, the thermal reactor heats up to the desired process temperature for oxidation, annealing, drive, or CVD. After performing the process, the thermal reactor cools to the stand-by temperature again and unloads the wafers. If the standby temperature, ramp up/down rate, and process temperatures are set in reasonable ranges, acceptable temperature control performance can be achieved during the process by using commonly known controllers. However, in order to optimize the performance of the process and in particular when the thermal process becomes more complex and/or requires improved tuning of the controller parameters commonly known systems require large periods of off-line calculation time which cannot be used for useful wafer processing making the process less efficient and hence more expensive. The temperature control systems as disclosed herein make the controls more stable, fast and effective without the need for downtime of the reactor. The improved dual cascade MBPC control system as disclosed herein provides in a real-time control of the thermal reactor by using simplified generic linear dynamic models for the fast and reliable calculation of the temperatures to be applied to the thermal reactor.

As the name implies, the MBPCs are based on a predictive model representing the behavior of the thermal reactor. In one embodiment, the temperature control system as disclosed herein provides that the first and/or second MBPC is provided with one or more generic linear dynamic models that characterize thermal response of the thermal reactor. In particular, the same generic linear dynamic model is provided for the first and the second MBPC. More in particular, the same generic linear dynamic model is provided for the first and the second MBPC but the steady state gain factor for the first and the second MBPC model is different.

In one embodiment, the generic linear dynamic model according to Equation (1a) to Equation (3a) is used for the second MBPC control loop. The model equations for the generic linear dynamic model used in the second MBPC are:

$$\tau\frac{dPd(t)}{dt} + Pd(t) = kSp(t) \tag{1a}$$

wherein Pd(t) is the paddle temperature output;
Sp(t) is the spike temperature input;

$$k \text{ is the steady state gain:} k = \frac{Pd}{Sp} \tag{2a}$$

$$\tau \text{ is the time constant:} \tau = \frac{\rho c_p V}{hA_S} \tag{3a}$$

wherein $\rho$ is density;
$c_p$ is specific heat;
V is the body volume;
H is heat transfer; and
$A_S$ is the surface area.

In one embodiment, the generic linear dynamic model according to Equation (1b) to Equation (3b) is used for the first MBPC control loop. The model equations for the generic linear dynamic model used in the first MBPC are:

$$\tau\frac{dSp(t)}{dt} + Sp(t) = kPw(t) \tag{1b}$$

wherein Sp(t) is the spike temperature output;
Pw(t) is the power input;

$$k \text{ is the steady state gain:} k = \frac{Sp}{Pw} \tag{2b}$$

$$\tau \text{ is the time constant:} \tau = \frac{\rho c_p V}{hA_S} \tag{3b}$$

wherein $\rho$ is density;
$c_p$ is specific heat;
V is the body volume;
H is heat transfer; and
$A_S$ is the surface area.

In one embodiment, disclosed herein is a temperature control system wherein model mismatch correction factors are added to the model predictive calculation and output optimization calculations.

In one embodiment, the temperature control system as disclosed herein provides that the first and/or second MBPC comprises a trajectory planner which automatically reduces a specified ramp rate when approaching a constant temperature control setpoint. The trajectory planer is added to the first and/or second MBPC control loop to generate the temperature control setpoint reference trajectory. Based on the desired ramp rate and temperature range, the trajectory planner divides the temperature range into two sub-ranges: fast ramp and reduced ramp. In the fast ramp sub-range, the planner generates the temperature control setpoints reference trajectories to enable the MBPC to achieve the desired ramp rate. In the reduced ramp sub-range, the planner provides at least one intuitive tuning parameter to control the temperature ramp speed to reach the desired control setpoint. Temperature stabilization time and overshoot are also controlled. This provides a flexible way to meet the varying temperature control requirements from the different processes.

In one embodiment, static limiters based on static models are embedded in the first and/or second MBPC loop. The limiters help the MBPC to generate the correct control setpoint for the inner-control loop under various control cases (normal, faster/slower ramp, boat in/out, different load or gas flow and so on).

Figure 2:
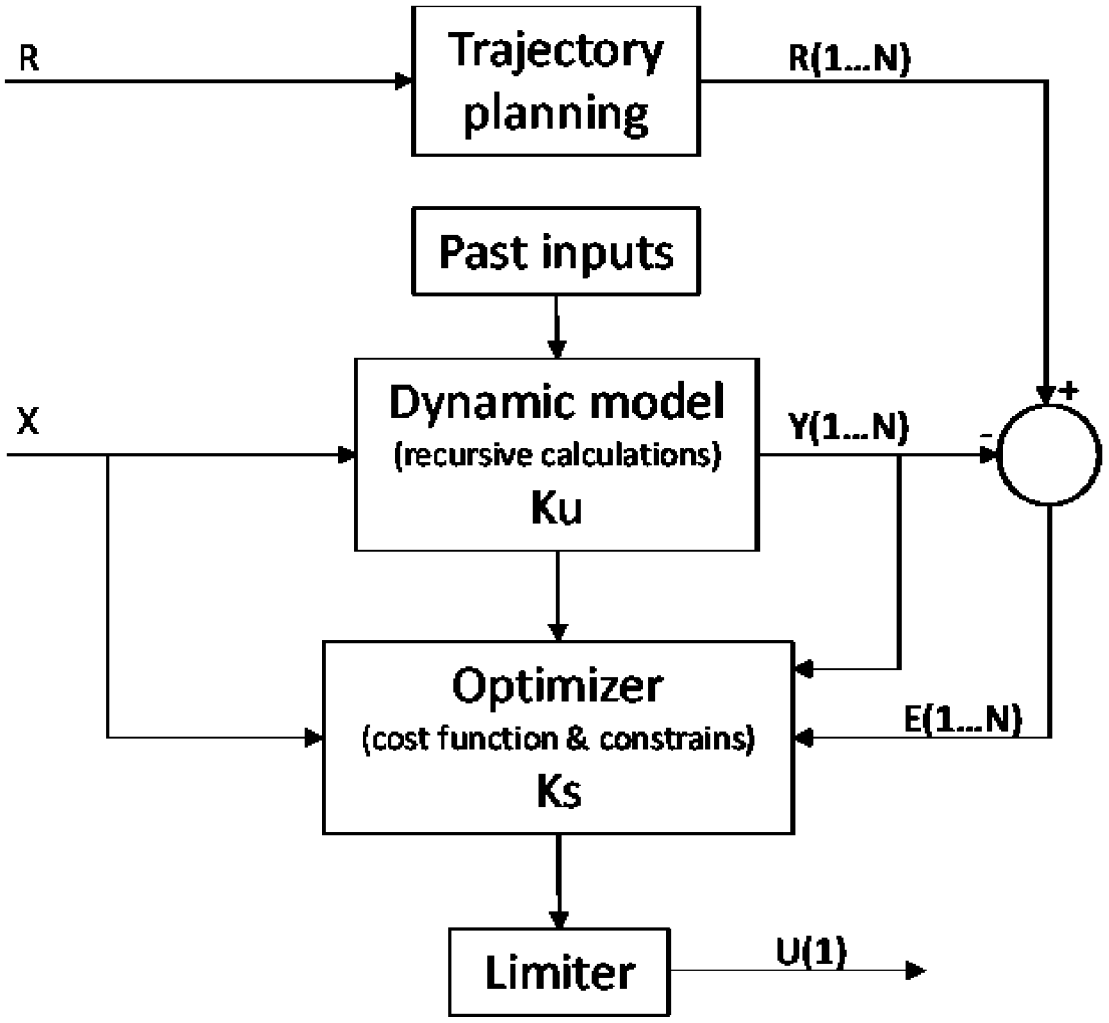
FIG. 2 shows the general structure of the MBPC control loop.

In FIG. 2 the general structure of the MBPC control loop is shown. This shows how the MBPC algorithm adapts the generic linear dynamic model where
R is the required variable, in the present case the required temperature;
R(1 . . . N) are the future setpoints of N samplings;
X is the controlled variable, in the present case the measured temperature;
Y(1 . . . N) are the predicted future temperatures of N samplings;
E(1 . . . N) are the errors between R(1 . . . N) and Y(1 . . . N);
U(1) is the manipulated variable, in the present case $Sp_{set}$ for MBPC2 and $Pw_{out}$ for MBPC1;
Ku is the parameter to correct the mode predictive calculation; and
Ks is the parameter to correct the predictive output.

The first and second MBPC control loops adapt the generic linear dynamic models. The predictive future process outputs are calculated recursively based on the dynamic model and past control inputs. The Ku parameter is added to correct the model calculations so that the control action can be adjusted. The optimal control actions are calculated by minimizing the differences between the future setpoints and the predicted outputs. The Ks parameter is added to correct the predicted outputs so that the optimal control performances can be obtained.

In one embodiment, the first and/or second MBPC control algorithm embeds intuitive tuning parameters (e.g., Ku, Ks) into the control law, the trajectory planner and the limiters. The intuitive tuning parameters can be used to improve both the dynamic control performance and the static control performances. The MBPC control structure and fixed-time predictive horizon avoids the need of online matrix inversion during wafer processing. As a consequence, the online computing overhead is greatly reduced. In this way, the dual cascade MBPC control system algorithm can be implemented on microprocessors typically used in practice in the semiconductor processing industry.

In one embodiment, a software detector and control logic are included to detect TC measurement hardware failure. When a TC sampling failure appears, the detector and control logic switch on a related soft temperature sensor that is based on dynamic model computing. Accordingly, if a TC sampling failure occurs the soft-sensor is used to replace the real TC a control system input. This prevents the reactor operation from shutting down, and reduces the loss of the whole batch process due to the detection of one or more temperature measurement hardware failures.

Figure 3:
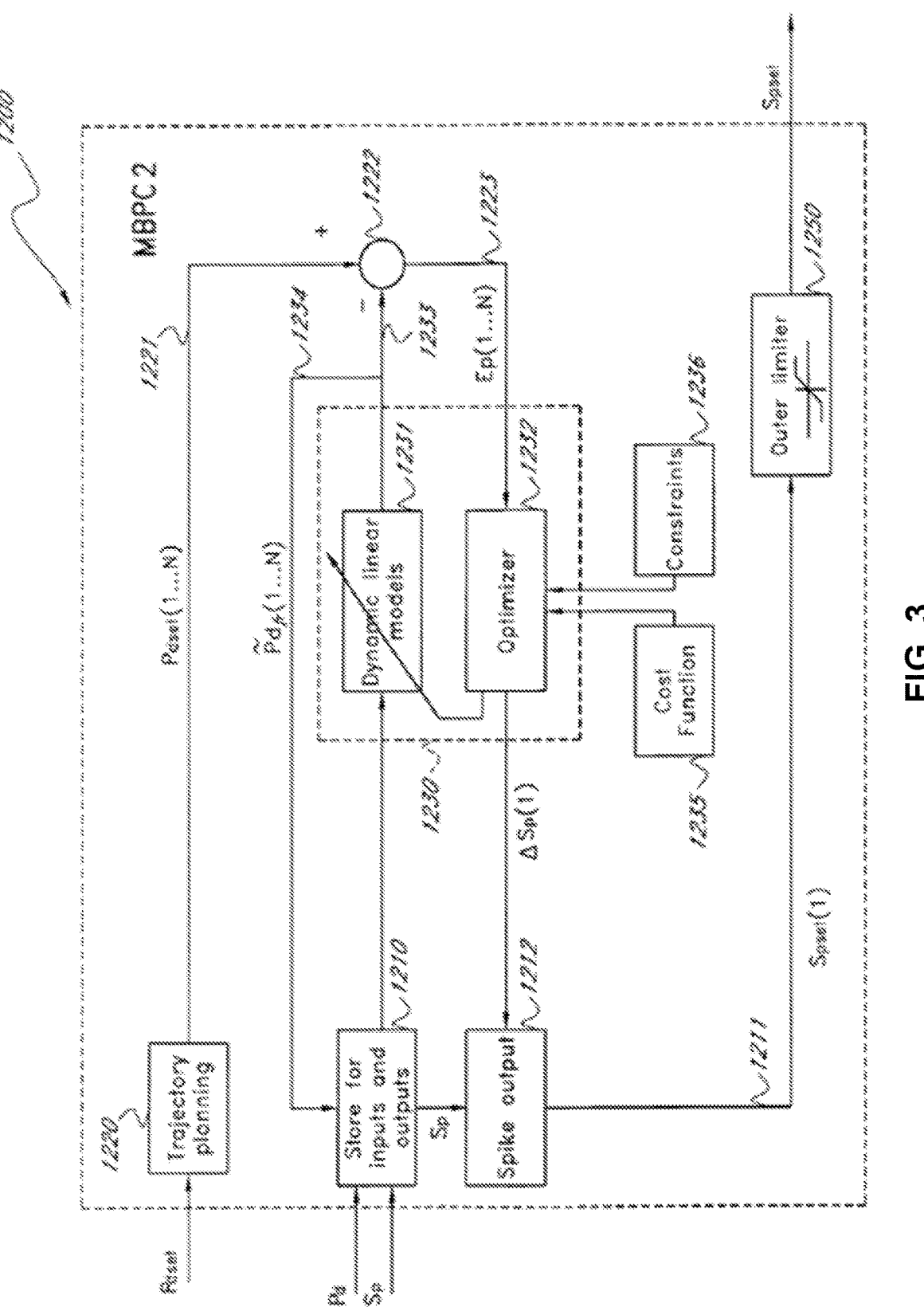
FIG. 3 shows the second MBPC controller structure used in the dual cascade MBPC control configuration.

According to a particular embodiment the internal structure of the second MBPC corresponds to the structure as depicted in FIG. 3. The second MBPC 1200 includes an MBPC algorithm module 1230, a trajectory planning module 1220, and an MBPC static model limiter 1250. The MBPC algorithm module 1230 includes a modeling module 1231, which performs the actual modeling based on the generic linear dynamic model according to Equation (1a) to Equation (3a), and an optimizer module 1232. Inputs to the MBPC controller 1200 are the paddle control setpoint temperature $Pd_{set}$, the actual paddle temperatures Pd and optionally the actual spike temperatures Sp. The paddle control setpoint temperature is provided to the trajectory planning module 1220. The actual paddle temperatures Pd and the optional actual spike temperatures Sp are provided to a memory 1210 for storing past inputs and outputs. The memory 1210 provides input to the MBPC algorithm module 1230. The Trajectory planning module 1220 generates N paddle control setpoints $Pd_{set}$ (1 . . . N) distributed over a predictive horizon, where $Pd_{set}(1)$ is the control setpoint for the present moment and $Pd_{set}(N)$ is the most future predicted control setpoint. These control setpoints $Pd_{set}$ (1 . . . N) are provided to a first input of an adder 1222 via a line 1221. Further, the modeled paddle values $\sim Pd_{fr}(1 . . . N)$, which are provided as output by the MBPC control algorithm module 1230, are provided to a second input of the adder 1222 via a line 1233. The adder 1222 calculates error signals Ep(1 . . . N) which are provided to the optimizer module 1232 of the MBPC algorithm module 1230 via a line 1223. The optimizer module 1232 optimizes the model output by minimizing a cost function 1235 as represented by equation (4a), using constraints 1236. The least-squares error between the modeled predicted paddle control setpoint temperatures $\sim Pd_{fr}(1 . . . N)$ and the actual paddle control setpoint temperatures $Pd_{set}(1 . . . N)$ from the trajectory planner 1220 is minimized over the predictive horizon. The predicted paddle control setpoint temperatures are optimized by using the disturbance model (the last term in equation (4a)) so that the predictive values approach the actual values. The spike correction value $\Delta Sp$ is calculated, according to equation (10a). The modeled values $\sim Pd_{fr}(1 . . . N)$ are provided to the memory 1210 via a line 1234. The spike correction value $\Delta Sp$ is provided from the MBPC algorithm into a spike output calculation module 1212 to calculate the modeled spike control setpoint $Sp_{set}(1)$ according to equation (11a). The modeled spike control setpoint $Sp_{set}$ (1) is provided to the output limiter 1250 via a line 1211 where the output is limited according to equation (12a) thereby calculating $Sp_{set}$. The algorithms will be discussed in further detail below.

Figure 4:
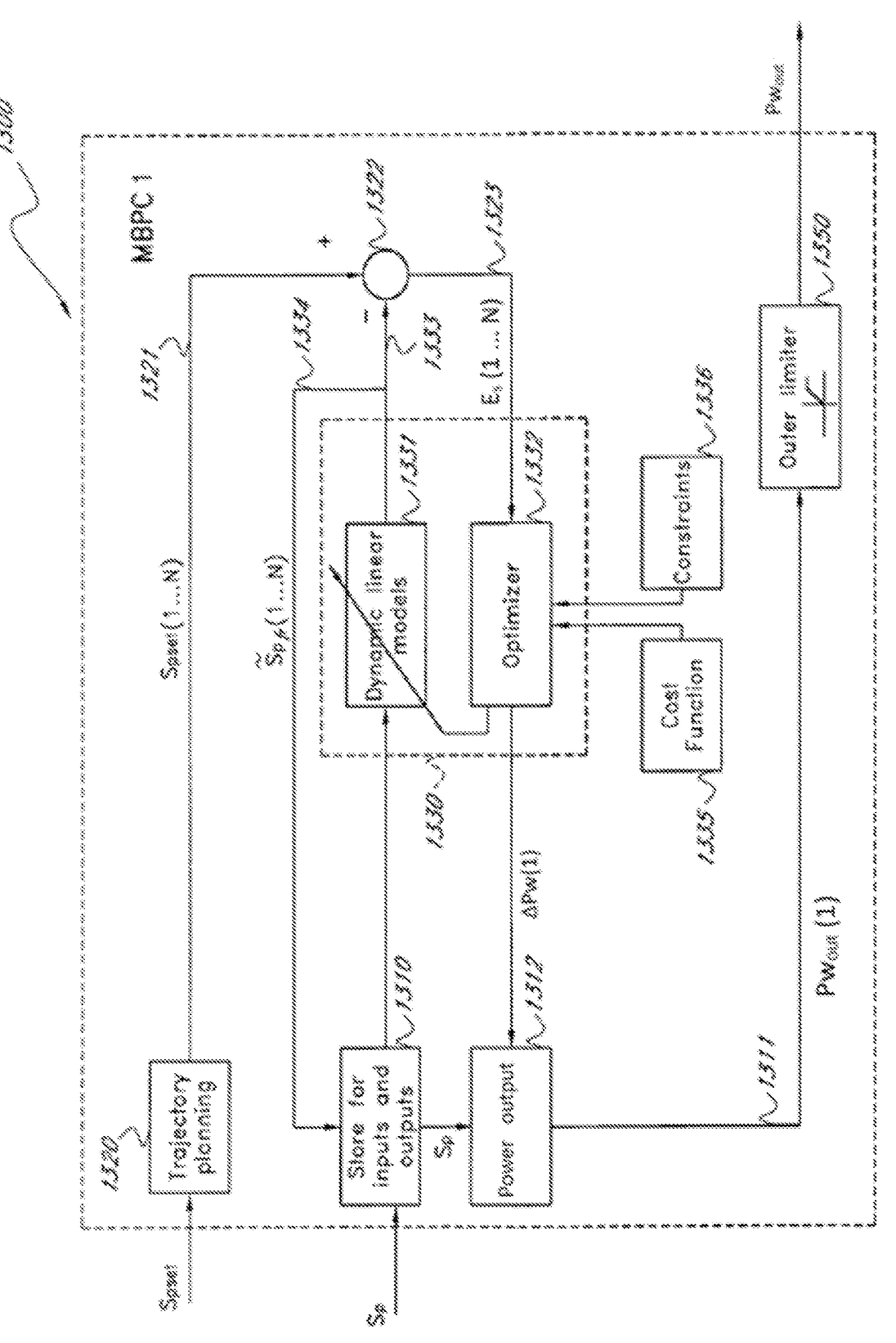
FIG. 4 shows the first MBPC controller structure used in the dual cascade MBPC control configuration.

According to a particular embodiment the internal structure of the first MBPC corresponds to the structure as depicted in FIG. 4. The first MBPC 1300 includes an MBPC algorithm module 1330, a trajectory planning module 1320, and an MBPC static model limiter 1350. The MBPC algorithm module 1330 includes a modeling module 1331, which performs the actual modeling based on the generic linear dynamic model according to Equation (1b) to Equation (3b), and an optimizer module 1332. Inputs to the MBPC controller 1300 are the spike temperature control setpoint $Sp_{set}$ and the actual spike temperatures Sp. The spike temperature control setpoint $Sp_{set}$ is provided to the trajectory planning module 1320. The actual spike temperatures Sp are provided to a memory 1310 for storing past inputs and outputs. The memory 1310 provides input to the MBPC algorithm module 1330. The Trajectory planning module 1320 generates N spike temperature control setpoint $Sp_{set}(1 . . . N)$ distributed over a predictive horizon, where $Sp_{set}$ (1) is the control setpoint for the present moment and $Sp_{set}(N)$ is the most future predicted control setpoint. These control setpoints $Sp_{set}(1 . . . N)$ are provided to a first input of an adder 1322 via a line 1321. Further, the modeled spike values $\sim Sp_{fr}(1 . . . N)$, which are provided as output by the MBPC control algorithm module 1330, are provided to a second input of the adder 1322 via a line 1333. The adder 1322 calculates error signals Es(1 . . . N) which are provided to the optimizer module 1332 of the MBPC algorithm module 1330 via a line 1323. The optimizer module 1332 optimizes the model output by minimizing a cost function 1335 as represented by equation (4b), using constraints 1336. The least-squares error between the modeled predicted spike control setpoint temperatures $\sim Sp_{fr}(1 . . . N)$ and the actual spike control setpoint temperatures $Sp_{set}(1 . . . N)$ from the trajectory planner 1320 is minimized over the predictive horizon. The predicted spike control setpoint temperatures are optimized by using the disturbance model (the last term in equation (4b)) so that the predictive values approach the actual values. The power correction value $\Delta Pw$ is calculated, according to equation (10b). The modeled values $\sim Sp_{fr}(1 . . . N)$ are provided to the memory 1310 via a line 1334. The power correction value $\Delta Pw$ is provided from the MBPC algorithm into a power output calculation module 1312 to calculate the modeled power control setpoint $Pw_{out}(1)$ according to equation (11b). The modeled power control setpoint $Pw_{out}(1)$ is provided to the output limiter 1350 via a line 1311 where the output is limited according to equation (12b). The algorithms will be discussed in further detail below.

Based on the generic linear dynamic model according to Equation (1a) to Equation (3a), the predictive control algorithm calculates the control strategy $Sp_{set}(t)$ for MBPC2 by minimizing the cost function J, defined as:

$$J = \Sigma_{k=1}^{N} k_u [Pd_{set}(t+k) - \tilde{P}d(t+k|t)]^2 + \Sigma_{k=1}^{N_u} k_s [\Delta Sp(t+k-1)]^2 \tag{4a}$$

where N and Nu are the prediction horizon, ku and ks are the weight parameters, and $Pd_{set}$ (t+k) is the $k^{th}$ paddle control setpoint generated by the trajectory planner. Further, $\tilde{P}d(t+k|t)$ is the $k^{th}$ model predictive output at time t, which can be considered as the combination result of two separate contributions:

$$\tilde{P}d(t+k|t) = \tilde{P}d_{fr}(t+k|t) + \tilde{P}d_{fo}(t+k|t) \tag{5a}$$

where $\tilde{P}d_{fr}(t+k|t)$ is the free response, and $\tilde{P}d_{fo}(t+k|t)$ is the forced response. Among them, $\tilde{P}d_{fr}(t+k|t)$ can be computed as:

$$\tilde{P}d_{fr}(t+k|t) = \Sigma_{i=1}^{l} a_i Pd(t-i+k|t) + \Sigma_{j=0}^{m} b_j Sp(t-j+k|t) + \Sigma_{r=t}^{n} d_r e(t-r+k|t) \tag{6a}$$

where $\Sigma_{r=t}^{n} d_r e(t-r+k|t)$ is the disturbance model output, and $$e(t) = [Pd(t) - \tilde{P}d_{fr}(t)] - [Sp_{set}(t-1) - Sp(t)]$$

Then, $\tilde{P}d_{fo}(t+k|t)$ can be calculated as:

$$\tilde{P}d_{fo}(t+k|t) = \Sigma_{i=0}^{N_u-1} g_{k-i} \Delta Sp(t+i|t) \tag{7a}$$

where $g_i$ can be obtained as:

$$g_i = \Sigma_{j=1}^{i} a_j g_{i-j} + \Sigma_{j=0}^{i-1} b_j g_k = 0 \text{ when } k \leq 0 \tag{8a}$$

By using matrix notation, and minimizing J with respect to $\Delta Sp$, the following simplified formulas can be used to calculate the spike setpoint:

$$\Delta Sp(t \mid t) = \frac{k_u \sum_{k=1}^{N} g_k \left[ Pd_{set}(t+k \mid t) - \check{P}d_{fr}(t+k \mid t) \right]}{\sum_{k=1}^{N} k_u g_k^2 + k_s} \tag{9a}$$

$$\Delta Sp(t \mid t) = \frac{k_u \sum_{j=1}^{N} \left( \sum_{j=1}^{k} a_j g_{i-j} + \sum_{j=0}^{k-1} b_j \right) \left[ Pd_{set}(t+k \mid t) - \check{P}d_{fr}(t+k \mid t) \right]}{k_u \sum_{k=1}^{N} \left( \sum_{j=1}^{k} a_j g_{i,j} + \sum_{j=0}^{k-1} b_j \right)^2 + k_s} \tag{10a}$$

In one embodiment, the MBPC employs a "receding horizon" control principle, where only the first element $\Delta Sp$ (t|t) is required to compute the MBPC output:

$$Sp_{set}(t) = Sp_{set}(t-1) + \Delta Sp(t|t) \tag{11a}$$

At the next sampling instant (t+1), the whole procedure is repeated.

In certain embodiments the MBPC further comprises a limiter to still function properly in case conceptual difficulties arise. To deal with these difficulties, limiters based on static models are added to the MBPC control loop. The limiters are defined as:

$$Sp_{set}^{n}(t) = \begin{cases} Sp_{set}^{min} & Sp_{set}^{n}(t) < Sp_{set}^{min} = -|Pd_{set}(t) + k_u \Delta T| \\ Sp_{set}^{n}(t) & Sp_{set}^{min} \le Sp_{set}^{n} \le Sp_{set}^{max} = |Sp_n(t) + k_u \Delta T| \\ Sp_{set}^{max} & Sp_{set}^{n}(t) < Sp_{set}^{max} \end{cases} \tag{12a}$$

where $\Delta T$ is an adjustable temperature constant for compensation of the model outputs mismatches, ku is a tuning parameter that is also used in the control law Equation (10a) (Tuning ku, can improve the temperature uniformity).

Based on the generic linear dynamic model according to Equation (1b) to Equation (3b), the predictive control algorithm calculates the power output $Pw_{out}(t)$ for MBPC1 using the same principles as indicated above but using the following adapted formulas:

$$J = \sum_{k=1}^{N} k_u \left[ Sp_{set}(t+k) - \check{S}p(t+k \mid t) \right]^2 + \sum_{k=1}^{N_u} k_s [\Delta Pw(t+k-1)]^2 \tag{4b}$$

$$\check{S}p(t+k \mid t) = \check{S}p_{fr}(t+k \mid t) + \check{S}p_{fo}(t+k \mid t) \tag{5b}$$

$$\check{S}p_{fr}(t+k \mid t) = \sum_{i=1}^{l} a_i Sp(t-i+k \mid t) + \sum_{j=0}^{m} b_j Sp(t-j+k \mid t) + \sum_{r=t}^{n} d_r e(t-r+k \mid t) \tag{6b}$$

$$\check{S}p_{fo}(t+k \mid t) = \sum_{i=0}^{N_u - 1} g_{k-i} \Delta Pw(t+i \mid t) \tag{7b}$$

$$g_i = \sum_{j=1}^{i} a_j g_{i-j} + \sum_{j=0}^{i-1} b_j g_k = 0 \text{ when } k \le 0 \tag{8b}$$

$$\Delta Pw(t \mid t) = \frac{k_u \sum_{k=1}^{N} g_k \left[ Sp_{set}(t+k \mid t) - \check{S}p_{fr}(t+k \mid t) \right]}{\sum_{k=1}^{N} k_u g_k^2 + k_s} \tag{9b}$$

$$\Delta Pw(t \mid t) = \frac{k_u \sum_{j=1}^{N} \left( \sum_{j=1}^{k} a_j g_{i-j} + \sum_{j=0}^{k-1} b_j \right) \left[ Sp_{set}(t+k \mid t) - \check{S}p_{fr}(t+k \mid t) \right]}{k_u \sum_{k=1}^{N} \left( \sum_{j=1}^{k} a_j g_{i,j} + \sum_{j=0}^{k-1} b_j \right)^2 + k_s} \tag{10b}$$

$$Pw_{out}(t) = Pw_{out}(t-1) + \Delta Pw(t \mid t) \tag{11b}$$

-continued $$Pw_{out}(t) = \begin{cases} Pw_{min} & Pw_{out}(t) < Pw_{low} \\ Pw_{out}(t) & Pw_{low} \ll Pw_{out}(t) \ll Pw_{high} \\ Pw_{high} & Pw_{out}(t) > Pw_{high} \end{cases} \tag{12b}$$

Another aspect of the present disclosure relates to a control system comprising:

a first control loop comprising a first Model-Based Predictive Controller (M BPC) for controlling a plant with an output signal that controls power to a heating element in a process chamber of said plant, said first MBPC being configured to receive sensor data from at least one spike temperature sensor located in proximity to the heating element and spaced from the process chamber, and said output signal is based at least in part on calculations in said first MBPC over a predictive time horizon; and a second control loop comprising a second MBPC, said second MBPC being configured to provide a control setpoint to said first MBPC, said control setpoint based at least in part on calculations in said second MBPC over a predictive time horizon, said second MBPC further configured to receive sensor data from:

(1) at least one paddle temperature sensor located inside or in proximity to the process chamber and spaced from the heating element; and optionally (2) at least one spike temperature sensor located in proximity to the heating element and spaced from the process chamber.

In one embodiment, the control system as disclosed herein provides that the first and/or second MBPC is provided with one or more generic linear dynamic models that characterize thermal response of the thermal reactor. In particular, the same generic linear dynamic model is provided for the first and the second MBPC. More in particular, the same generic linear dynamic model is provided for the first and the second MBPC but the steady state gain factor for the first and the second MBPC model is different.

In one embodiment, disclosed herein is a control system wherein model mismatch correction factors are added to the model predictive calculation and output optimization calculations.

Another aspect of the present disclosure relates to a method for controlling a plant having a process chamber, comprising:

providing control inputs to said plant from a first control loop, said first control loop comprising a first MBPC configured to receive sensor data from a at least one spike temperature sensor located in proximity to a heating element and spaced from the process chamber, and said control inputs being based at least in part on calculations in said first MBPC over a predictive time horizon; and providing a control setpoint to said first control loop, said control setpoint being computed by a second control loop comprising a second MBPC configured to receive sensor data from:

(1) at least one paddle temperature sensor located inside or in proximity to the process chamber and spaced from the heating element; and optionally (2) at least one spike temperature sensor located in proximity to the heating element and spaced from the process chamber;

said second MBPC further being configured to receive a control process sequence for said plant, and said second MBPC being configured to calculate said control setpoint based at least in part on calculations in said second MBPC over a predictive time horizon.

In one embodiment, the method as disclosed herein provides that the first and/or second MBPC is provided with one or more generic linear dynamic models that characterize thermal response of the thermal reactor. In particular, the same generic linear dynamic model is employed in the first and the second MBPC. More in particular, the same generic linear dynamic model is employed in the first and the second MBPC but the steady state gain factor used for the first and the second MBPC model is different.

In one embodiment, disclosed herein is a method wherein model mismatch correction factors are added to the model predictive calculation and output optimization calculations.

The invention claimed is:

1. A temperature control system for a thermal reactor having a process chamber, the temperature control system comprising:

a first control loop comprising a first Model-Based Predictive Controller (MBPC), which uses a spike temperature sensor signal from a spike temperature sensor as input, and which provides a power output signal that controls power to a heating element of the thermal reactor, the spike temperature sensor being located in proximity to the heating element and spaced from the process chamber, wherein the first MBPC is provided with a first predictive model representing behavior of the thermal reactor, the first MBPC being configured to calculate a first output value based on first calculations over a first predictive time horizon, using the first predictive model, said first output value controlling the power output signal; and a second control loop comprising a second MBPC, which uses a paddle temperature sensor signal from a paddle temperature sensor and the spike temperature sensor signal as inputs, and which provides as a spike temperature control setpoint that is used as input for the first MBPC, the paddle temperature sensor being spaced from the heating element and located inside or in proximity to the process chamber, wherein the second MBPC is provided with a second predictive model representing the behavior of the thermal reactor, the second MBPC being configured to calculate a second output value based on second calculations over a second predictive time horizon, using the second predictive model, the second output value controlling the spike temperature control setpoint.

2. The temperature control system according to claim 1, wherein the first or the second MBPC is provided with a generic linear dynamic model that characterizes thermal response of the thermal reactor.

3. The temperature control system according to claim 2, wherein the first and the second MBPC is provided with the generic linear dynamic model that characterizes the thermal response of the thermal reactor.

4. The temperature control system according to claim 3, wherein a steady state gain factor for the first and the second MBPC is different.

5. The temperature control system according to claim 2, wherein the first or the second MBPC adds model mismatch correction factors to a predictive calculation and an output optimization calculation to adapt the generic linear dynamic model.

6. The temperature control system according to claim 1, wherein the first or second MBPC comprises a trajectory planner which automatically reduces a specified ramp rate when approaching a constant temperature control setpoint.

7. A control system comprising:

a first control loop comprising a first Model-Based Predictive Controller (MBPC) for controlling a plant with an output signal that controls power to a heating element in a process chamber of said plant, wherein said first MBPC is configured to receive first sensor data from at least one spike temperature sensor located in proximity to the heating element and spaced from the process chamber, and said output signal is based at least in part on first calculations in said first MBPC over a first predictive time horizon; and a second control loop comprising a second MBPC, wherein said second MBPC is configured to provide a control setpoint to said first MBPC, said control setpoint is based on second calculations in said second MBPC over a second predictive time horizon, and said second MBPC is further configured to receive second sensor data from:

(1) at least one paddle temperature sensor located inside or in proximity to the process chamber and spaced from the heating element; and (2) the at least one spike temperature sensor.

8. The control system according to claim 7, wherein the first or the second MBPC is provided with a generic linear dynamic model that characterizes thermal response of the process chamber.

9. The control system according to claim 8, wherein the first and the second MBPC is provided with the generic linear dynamic model that characterizes the thermal response of the process chamber.

10. The control system according to claim 9, wherein a steady state gain factor for the first and the second MBPC is different.

11. The control system according to claim 8, wherein the first or the second MBPC adds model mismatch correction factors to a model predictive calculation and an output optimization calculation to adapt the generic linear dynamic model.

12. A method for controlling a plant having a process chamber, comprising:

providing control inputs to said plant from a first control loop, said first control loop comprising a first Model-Based Predictive Controller (MBPC) configured to receive first sensor data from at least one spike temperature sensor located in proximity to a heating element and spaced from the process chamber, and said control inputs being based at least in part on first calculations in said first MBPC over a first predictive time horizon; and providing a control setpoint to said first control loop, said control setpoint being computed by a second control loop comprising a second MBPC configured to receive second sensor data from:

(1) at least one paddle temperature sensor located inside or in proximity to the process chamber and spaced from the heating element; and (2) the at least one spike temperature sensor;

said second MBPC further being configured to receive a control process sequence for said plant, and said second MBPC being configured to calculate said control setpoint based on second calculations in said second MBPC over a second predictive time horizon.

13. The method according to claim 12, wherein the first or the second MBPC is provided with a generic linear dynamic model that characterizes thermal response of the process chamber.

14. The method according to claim 13, wherein the first and the second MBPC is provided with the generic linear dynamic model that characterizes the thermal response of the process chamber and wherein a steady state gain factor for the first and the second MBPC is different.

15. The method according to claim 13, further comprising:

adapting, with the first or the second MBPC, the generic linear dynamic model by adding model mismatch correction factors to a model predictive calculation and an output optimization calculation.

\* \* \* \* \*